US012379537B1

(12) United States Patent
Hu et al.

(10) Patent No.: US 12,379,537 B1
(45) Date of Patent: Aug. 5, 2025

(54) OPTICAL SYSTEMS WITH ARTIFACT BLOCKING STRUCTURES

(71) Applicant: Apple Inc., Cupertino, CA (US)

(72) Inventors: Di Hu, Mountain View, CA (US); Hyungryul Choi, San Jose, CA (US); Jaebum Chung, Mountain View, CA (US); Byron R Cocilovo, Boulder, CO (US); Jian Gao, Fremont, CA (US); Ligang Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 17/898,142

(22) Filed: Aug. 29, 2022

Related U.S. Application Data (60) Provisional application No. 63/240,290, filed on Sep. 2, 2021.

(51) Int. Cl.
*F21V 8/00* (2006.01)
*G02B 27/01* (2006.01)

(52) U.S. Cl.
CPC ......... *G02B 6/0036* (2013.01); *G02B 6/0038* (2013.01); *G02B 27/0172* (2013.01); *G02B 2027/011* (2013.01); *G02B 2027/0123* (2013.01)

(58) Field of Classification Search
CPC ............................ G02B 27/01; G02B 27/0101; G02B 27/0172; G02B 2027/0118; G02B 2027/013; G02B 2027/0161; G02B 2027/011; G02B 2027/0123; G02B 2027/0114; G02B 2027/0116
See application file for complete search history.

(56) References Cited

U.S. PATENT DOCUMENTS 10,838,110 B2  11/2020  Glik et al.
10,983,352 B2  4/2021  Chan et al.
(Continued)

FOREIGN PATENT DOCUMENTS

WO  WO-2018108618 A1 *  6/2018  ......... A61B 1/00174

OTHER PUBLICATIONS

Cheng et al., "Design of an optical see-through head-mounted display with a low f-number and large field of view using a freeform prism", Applied Optics, vol. 48, No. 14, 2009 (Year: 2009).*

*Primary Examiner* — Thomas A Hollweg
*Assistant Examiner* — Kirsten D. Endresen
(74) *Attorney, Agent, or Firm* — Treyz Law Group, P.C.; Michael H. Lyons (57) ABSTRACT

An electronic device may include a display with a waveguide and a surface relief grating (SRG) on the waveguide. The SRG may direct image light towards an eye box. An optical blocker may at least partially overlap the SRG. The blocker may include a first optical wedge having a curved surface and a second optical wedge separated from the curved surface by an air gap or a low refractive index material. The curved surface may have a freeform shape that configures the first optical wedge to propagate world light incident upon the blocker within a selected range of incident angles away from the SRG via total internal reflection. The blocker may transmit world light at other incident angles to the eye box through the waveguide. This may allow the blocker to block high incident angle world light from reaching the SRG and producing unsightly rainbow artifacts at the eye box.

21 Claims, 6 Drawing Sheets

(56) References Cited

U.S. PATENT DOCUMENTS

| | | |
|---|---|---|
| 11,067,797 B2 | 7/2021 | Schowengerdt et al. |
| 11,295,680 B2 | 4/2022 | Wyatt |
| 11,428,942 B2 | 8/2022 | Russell |
| 2016/0231567 A1 | 8/2016 | Saarikko et al. |
| 2020/0192097 A1* | 6/2020 | Kim .................... C07D 401/14 |
| 2020/0264378 A1* | 8/2020 | Grant ................. G02B 27/0081 |
| 2021/0055551 A1 | 2/2021 | Chi et al. |
| 2021/0116712 A1 | 4/2021 | Manly et al. |
| 2021/0215938 A1 | 7/2021 | Maimone et al. |
| 2021/0231951 A1 | 7/2021 | Dominguez et al. |
| 2021/0278672 A1 | 9/2021 | Messer et al. |
| 2021/0405402 A1 | 12/2021 | Cheng et al. |
| 2022/0357580 A1 | 11/2022 | Russell |

\* cited by examiner

OPTICAL SYSTEMS WITH ARTIFACT BLOCKING STRUCTURES

This application claims the benefit of U.S. Provisional Patent Application No. 63/240,290, filed Sep. 2, 2021, which is hereby incorporated by reference herein in its entirety.

BACKGROUND

This disclosure relates generally to optical systems and, more particularly, to optical systems for electronic devices with displays.

Electronic devices often include displays that present images close to a user's eyes. For example, virtual and augmented reality headsets may include displays with optical elements that allow users to view the displays.

Devices such as these can be challenging to design. If care is not taken, the components used to display images in these devices can be unsightly and bulky and may not exhibit a desired optical performance. In addition, environmental light incident upon the devices at high angles can produce unsightly artifacts in the displayed images.

SUMMARY

An electronic device may have a display system. The display system may include a waveguide, an input coupler, and a surface relief grating (SRG) structure. The SRG structure may form part of a cross-coupler, output coupler, or interleaved coupler, as examples. The SRG structure may direct image light towards an eye box. An optical blocker may at least partially overlap the SRG structure.

The optical blocker may include a first optical wedge having a curved surface and a second optical wedge having a curved surface that is separated from the curved surface of the first optical wedge by an air gap or other low refractive index materials. The waveguide may be optically interposed between the optical blocker and the eye box. The curved surface of the first optical wedge may have a shape that configures the first optical wedge to propagate world light incident upon the optical blocker within a selected range of incident angles (e.g., high incident angles) away from the SRG structure via total internal reflection. The optical blocker may transmit world light at other incident angles to the eye box through the waveguide. This may allow the optical blocker to block high incident angle world light from reaching the SRG structure and producing unsightly rainbow artifacts at the eye box.

DETAILED DESCRIPTION

Figure 1:
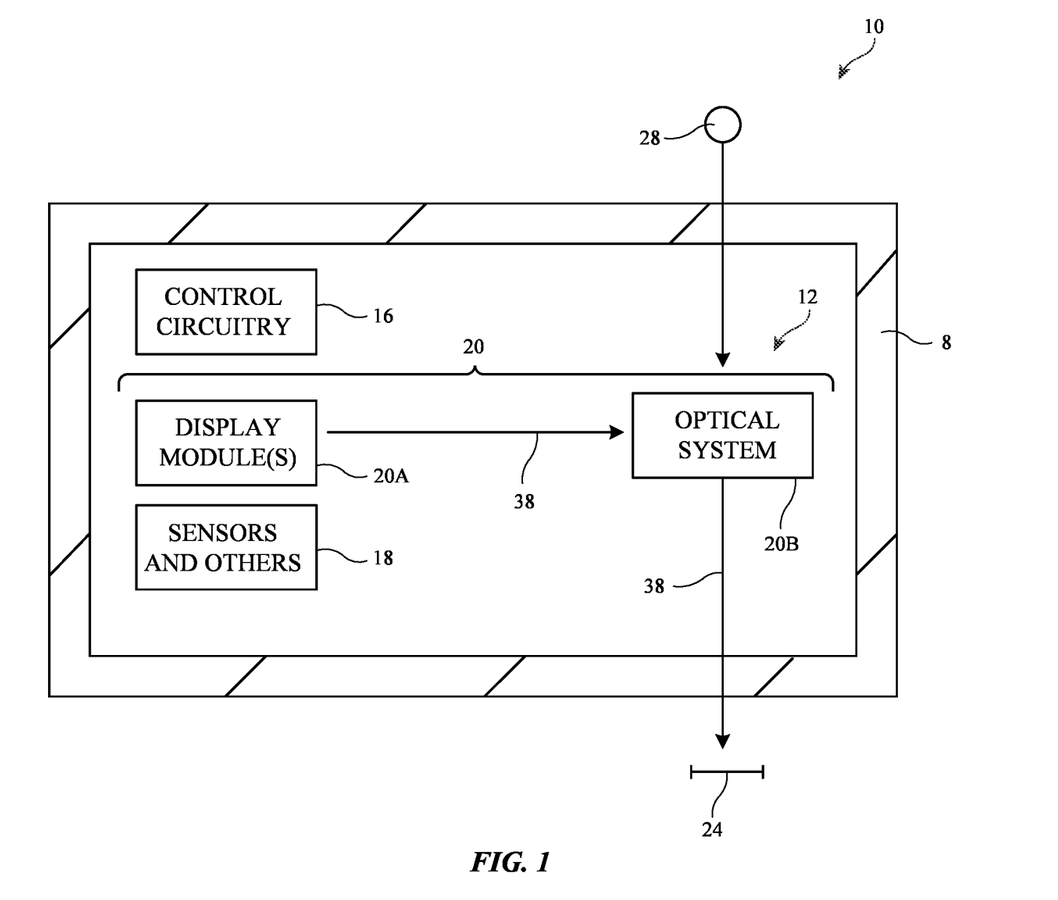
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 8. Support structure 8 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Display modules 20A may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light, etc.

Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
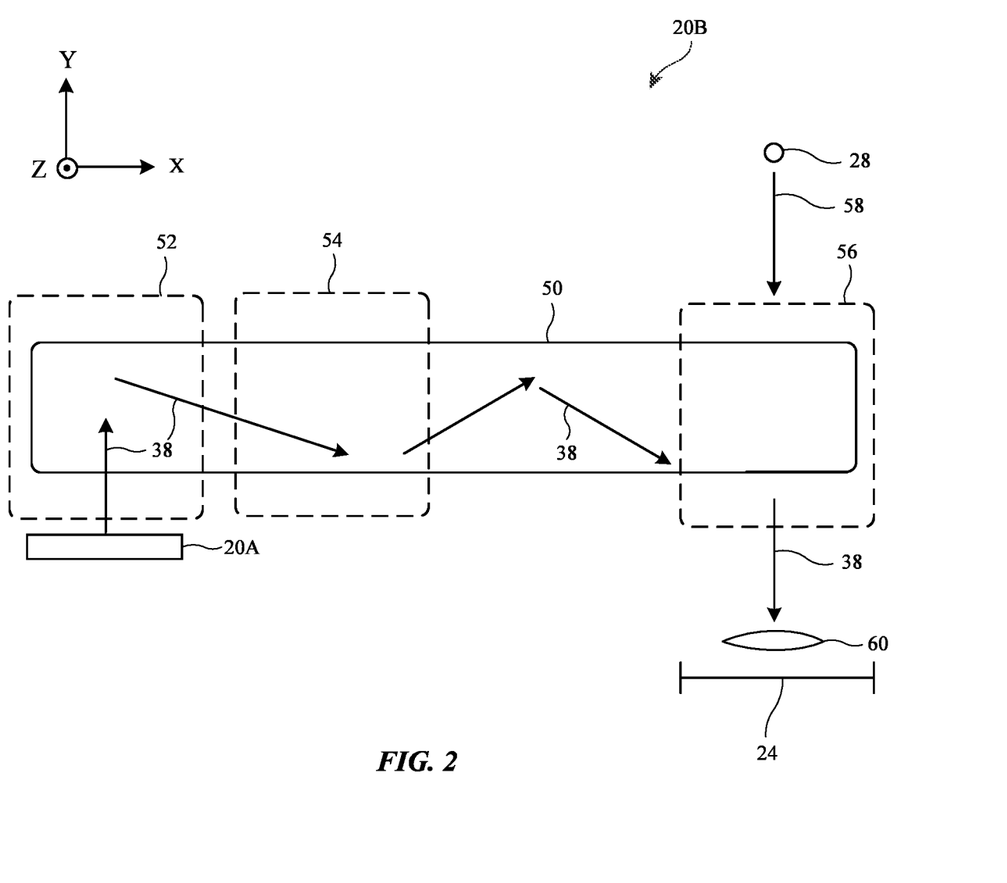
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, near-eye display 20 may include one or more display modules such as display module(s) 20A and an optical system such as optical system 20B. Optical system 20B may include optical elements such as one or more waveguides 50. Waveguide 50 may include one or more stacked substrates (e.g., stacked planar and/or curved layers sometimes referred to herein as waveguide substrates) of optically transparent material such as plastic, polymer, glass, etc.

If desired, waveguide 50 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the virtual image. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 50 may include holographic phase gratings such as volume holograms or thin-film holograms, meta-gratings, or any other desired diffractive grating structures. The diffractive gratings on waveguide 50 may also include surface relief gratings formed on one or more surfaces of the substrates in waveguides 50, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 50 if desired.

As shown in FIG. 2, display module 20A may generate image light 38 associated with image content to be displayed to eye box 24 (e.g., image light 38 may convey a series of image frames for display at eye box 24). Image light 38 may be collimated using a collimating lens if desired. Optical system 20B may be used to present image light 38 output from display module 20A to eye box 24. If desired, display module 20A may be mounted within support structure 8 of FIG. 1 while optical system 20B may be mounted between portions of support structure 8 (e.g., to form a lens that aligns with eye box 24). Other mounting arrangements may be used, if desired.

Optical system 20B may include one or more optical couplers (e.g., light redirecting elements) such as input coupler 52, cross-coupler 54, and output coupler 56. In the example of FIG. 2, input coupler 52, cross-coupler 54, and output coupler 56 are formed at or on waveguide 50. Input coupler 52, cross-coupler 54, and/or output coupler 56 may be completely embedded within the substrate layers of waveguide 50, may be partially embedded within the substrate layers of waveguide 50, may be mounted to waveguide 50 (e.g., mounted to an exterior surface of waveguide 50), etc.

Waveguide 50 may guide image light 38 down its length via total internal reflection. Input coupler 52 may be configured to couple image light 38 from display module 20A into waveguide 50, whereas output coupler 56 may be configured to couple image light 38 from within waveguide 50 to the exterior of waveguide 50 and towards eye box 24. Input coupler 52 may include an input coupling prism, an edge or face of waveguide 50, a lens, a steering mirror or liquid crystal steering element, or any other desired input coupling elements. As an example, display module 20A may emit image light 38 in direction +Y towards optical system 20B. When image light 38 strikes input coupler 52, input coupler 52 may redirect image light 38 so that the light propagates within waveguide 50 via total internal reflection towards output coupler 56 (e.g., in direction +X within the total internal reflection (TIR) range of waveguide 50). When image light 38 strikes output coupler 56, output coupler 56 may redirect image light 38 out of waveguide 50 towards eye box 24 (e.g., back along the Y-axis). A lens such as lens 60 may help to direct or focus image light 38 onto eye box 24. Lens 60 may be omitted if desired. In scenarios where cross-coupler 54 is formed on waveguide 50, cross-coupler 54 may redirect image light 38 in one or more directions as it propagates down the length of waveguide 50, for example. In redirecting image light 38, cross-coupler 54 may also perform pupil expansion on image light 38.

Input coupler 52, cross-coupler 54, and/or output coupler 56 may be based on reflective and refractive optics or may be based on diffractive (e.g., holographic) optics. In arrangements where couplers 52, 54, and 56 are formed from reflective and refractive optics, couplers 52, 54, and 56 may include one or more reflectors (e.g., an array of micromirrors, partial mirrors, louvered mirrors, or other reflectors). In arrangements where couplers 52, 54, and 56 are based on diffractive optics, couplers 52, 54, and 56 may include diffractive gratings (e.g., volume holograms, surface relief gratings, etc.).

The example of FIG. 2 is merely illustrative. Optical system 20B may include multiple waveguides that are laterally and/or vertically stacked with respect to each other. Each waveguide may include one, two, all, or none of couplers 52, 54, and 56. Waveguide 50 may be at least partially curved or bent if desired. One or more of couplers 52, 54, and 56 may be omitted. If desired, optical system 20B may include an optical coupler that performs the operations of both cross-coupler 54 and output coupler 56 (sometimes referred to herein as an interleaved coupler, a diamond coupler, or a diamond expander). For example, a surface relief grating structure may redirect image light 38 as the image light propagates down waveguide 50 (e.g., while expanding the image light) and the surface relief grating structure may also couple image light 38 out of waveguide 50 and towards eye box 24.

Figure 3A:
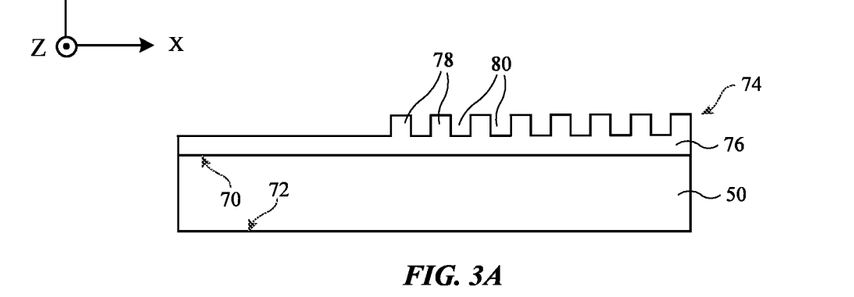
FIGS. 3A-3C are top views of illustrative a waveguide provided with a surface relief grating structure in accordance with some embodiments.

FIG. 3A is a top view showing one example of how a surface relief grating structure may be formed on waveguide 50. As shown in FIG. 3A, waveguide 50 may have a first lateral (e.g., exterior) surface 70 and a second lateral surface 72 opposite lateral surface 70. Waveguide 50 may include any desired number of one or more stacked waveguide substrates. If desired, waveguide 50 may also include a layer of grating medium sandwiched (interposed) between first and second waveguide substrates (e.g., where the first waveguide substrate includes lateral surface 70 and the second waveguide substrate includes lateral surface 72).

Waveguide 50 may be provided with a surface relief grating structure such as surface relief grating structure 74. Surface relief grating (SRG) structure 74 may be formed within a substrate such as a layer of SRG substrate (medium) 76. In the example of FIG. 3A, SRG substrate 76 is layered onto lateral surface 70 of waveguide 50. This is merely illustrative and, if desired, SRG substrate 76 may be layered onto lateral surface 72 (e.g., the surface of waveguide 50 that faces the eye box).

If desired, SRG structure 74 may include one surface relief grating or at least two partially-overlapping surface relief gratings. Each surface relief grating in SRG structure 74 may be defined by corresponding ridges (peaks) 78 and troughs (minima) 80 in the thickness of SRG substrate 76. In the example of FIG. 3A, SRG structure 74 is illustrated for the sake of clarity as a binary structure in which the surface relief gratings in SRG structure 74 are defined either by a first thickness associated with peaks 78 or a second thickness associated with troughs 80. This is merely illustrative. If desired, SRG structure 74 may be non-binary (e.g., may include any desired number of thicknesses following any desired profile, may include peaks 78 that are angled at non-parallel fringe angles with respect to the Y axis, etc.). If desired, SRG substrate 76 may be adhered to lateral surface 70 of waveguide 50 using a layer of adhesive (not shown). SRG structure 74 may be fabricated separately from waveguide 50 and may be adhered to waveguide 50 after fabrication, for example.

Figure 3B:
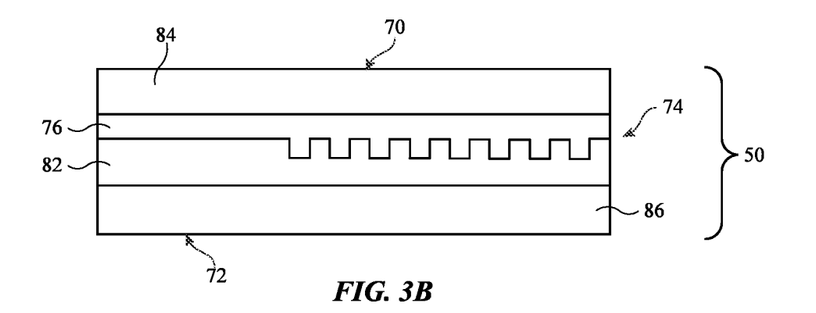

The example of FIG. 3A is merely illustrative. In another implementation, SRG structure 74 may be placed at a location within the interior of waveguide 50, as shown in the example of FIG. 3B. As shown in FIG. 3B, waveguide 50 may include a first waveguide substrate 84, a second waveguide substrate 86, and a media layer 82 interposed between waveguide substrate 84 and waveguide substrate 86. Media layer 82 may be a grating or holographic recording medium, a layer of adhesive, a polymer layer, a layer of waveguide substrate, or any other desired layer within waveguide 50. SRG substrate 76 may be layered onto the surface of waveguide substrate 84 that faces waveguide substrate 86. Alternatively, SRG substrate 76 may be layered onto the surface of waveguide substrate 86 that faces waveguide substrate 84.

Figure 3C:
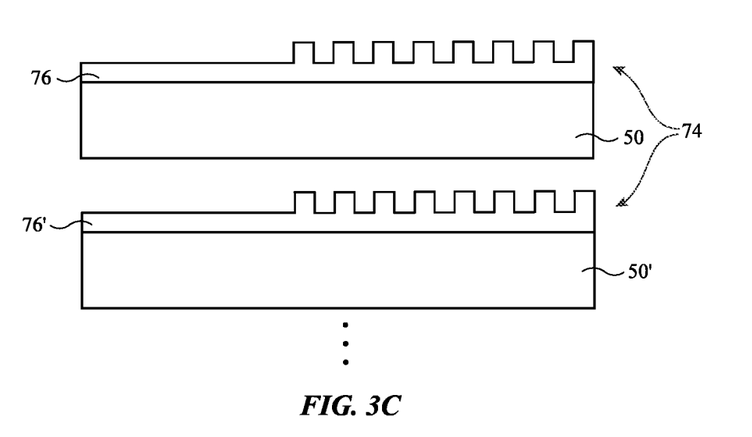

If desired, SRG structure 74 may be distributed across multiple layers of SRG substrate, as shown in the example of FIG. 3C. As shown in FIG. 3C, the optical system may include multiple stacked waveguides such as at least a first waveguide 50 and a second waveguide 50'. A first SRG substrate 76 may be layered onto one of the lateral surfaces of waveguide 50 whereas a second SRG substrate 76' is layered onto one of the lateral surfaces of waveguide 50'. First SRG substrate 76 may include one or more of the surface relief gratings in SRG structure 74. Second SRG substrate 76' may include one or more of the surface relief gratings in SRG structure 74. This example is merely illustrative. If desired, the optical system may include more than two stacked waveguides and/or SRG substrates with one or more respective SRGs. In examples where the optical system includes more than two waveguides, each waveguide that is provided with an SRG substrate may include one or more of the surface relief gratings in SRG structure 74. While described herein as separate waveguides, waveguides 50 and 50' of FIG. 3C may also be formed from respective waveguide substrates of the same waveguide, if desired. The arrangements in FIGS. 3A, 3B, and/or 3C may be combined if desired. SRG structure 74 may be used to form cross coupler 54 and/or output coupler 56 of FIG. 2 and/or to form an interleaved coupler on waveguide 50, as examples.

Figure 4:
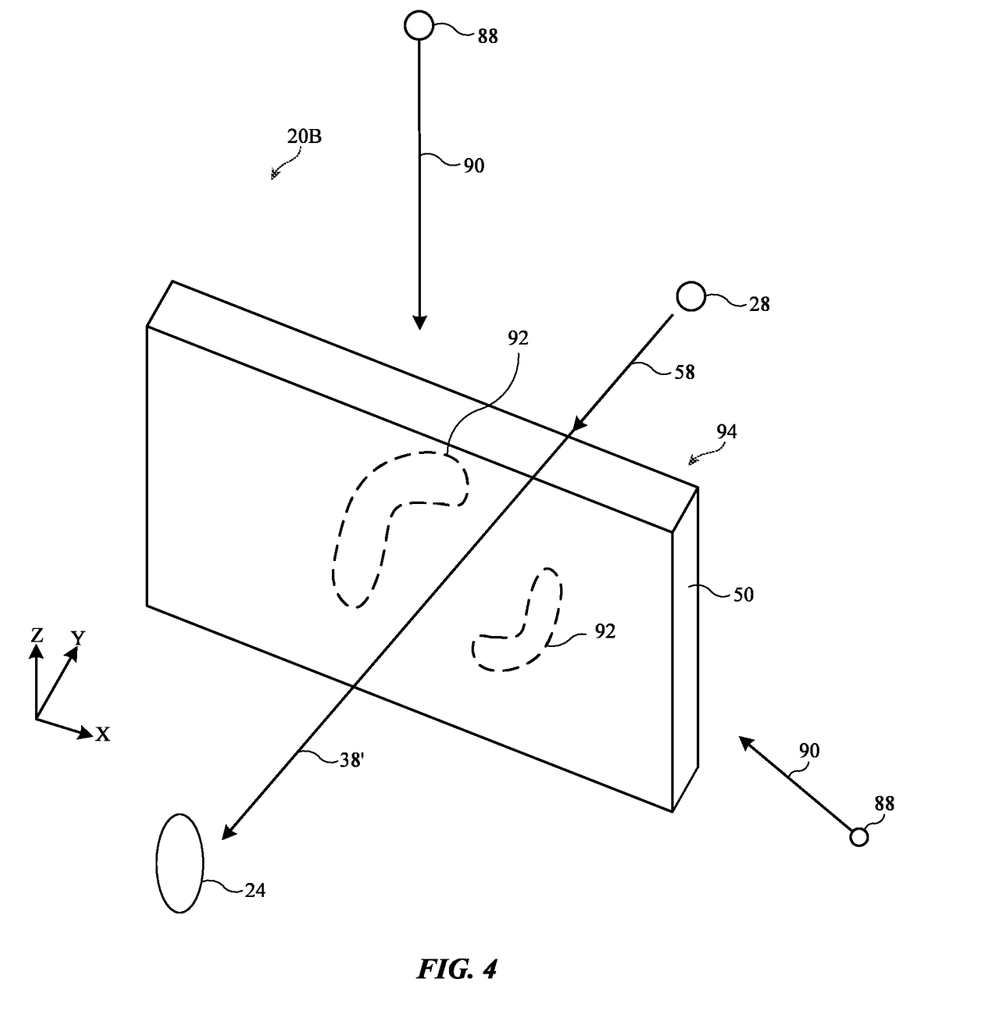
FIG. 4 is a perspective view of an illustrative waveguide that may direct image light and world light to an eye box in accordance with some embodiments.

If care is not taken, real-world light incident on SRG structure 74 in waveguide 50 at certain angles may produce undesirable visual artifacts (e.g., flare light of one or more colors) that would otherwise not naturally reach eye box 24. FIG. 4 is a perspective view of waveguide 50 showing how some real-world light may produce undesirable visual artifacts at eye box 24.

As shown in FIG. 4, world light 58 from real-world objects 28 may pass through waveguide 50 to eye box 24 (e.g., as part of light 38', which may also include image light 38 output by output coupler 56). Waveguide 50 may be configured to provide world light 58 to eye box 24 within a corresponding field of view (e.g., a field of view of the display). It may be desirable for the field of view to be as large as possible (e.g., to allow the viewer to view as much content as possible).

However, world light incident on waveguide 50 at certain angles may be undesirably diffracted by the SRG structure 74 in waveguide 50 (e.g., within cross-coupler 54 and/or output coupler 56 of FIG. 2) at different output angles for different wavelengths and may subsequently propagate towards eye box 24. This may produce undesirable visual artifacts such as visual artifacts 92. Visual artifacts 92 may, for example, present as rainbow artifacts in which a rainbow of different colors is visible at eye box 24 despite no such rainbow being present in world light 58, world light 90, or image light 38. Visual artifacts 92 may therefore sometimes be referred to herein as flares 92, flare artifacts 92, or rainbow artifacts 92.

In practice, visual artifacts 92 are produced by SRG structure 74 in response to world light 90 that is incident at relatively high (or low) angles with respect to a normal axis of the lateral surface 94 of waveguide 50 (e.g., the planar surface of waveguide 50 lying in the X-Z plane of FIG. 4). As examples, world light 90 may be incident at angles relative to the normal axis that are greater than 45 degrees, greater than 50 degrees, greater than 55 degrees, greater than 60 degrees, greater than 65 degrees, greater than 70 degrees, etc. World light 90 may therefore sometimes be referred to herein as flare-inducing world light 90 or high-angle world light 90. World light 90 may be emitted by and/or reflected off external (real-world) objects such as objects 88. Objects 88 may include, for example, overhead lights (e.g., ceiling lights or lights over the user's head), the sun, the moon, and/or any other reflective and/or emissive objects that produce flare-inducing world light 90.

Figure 5:
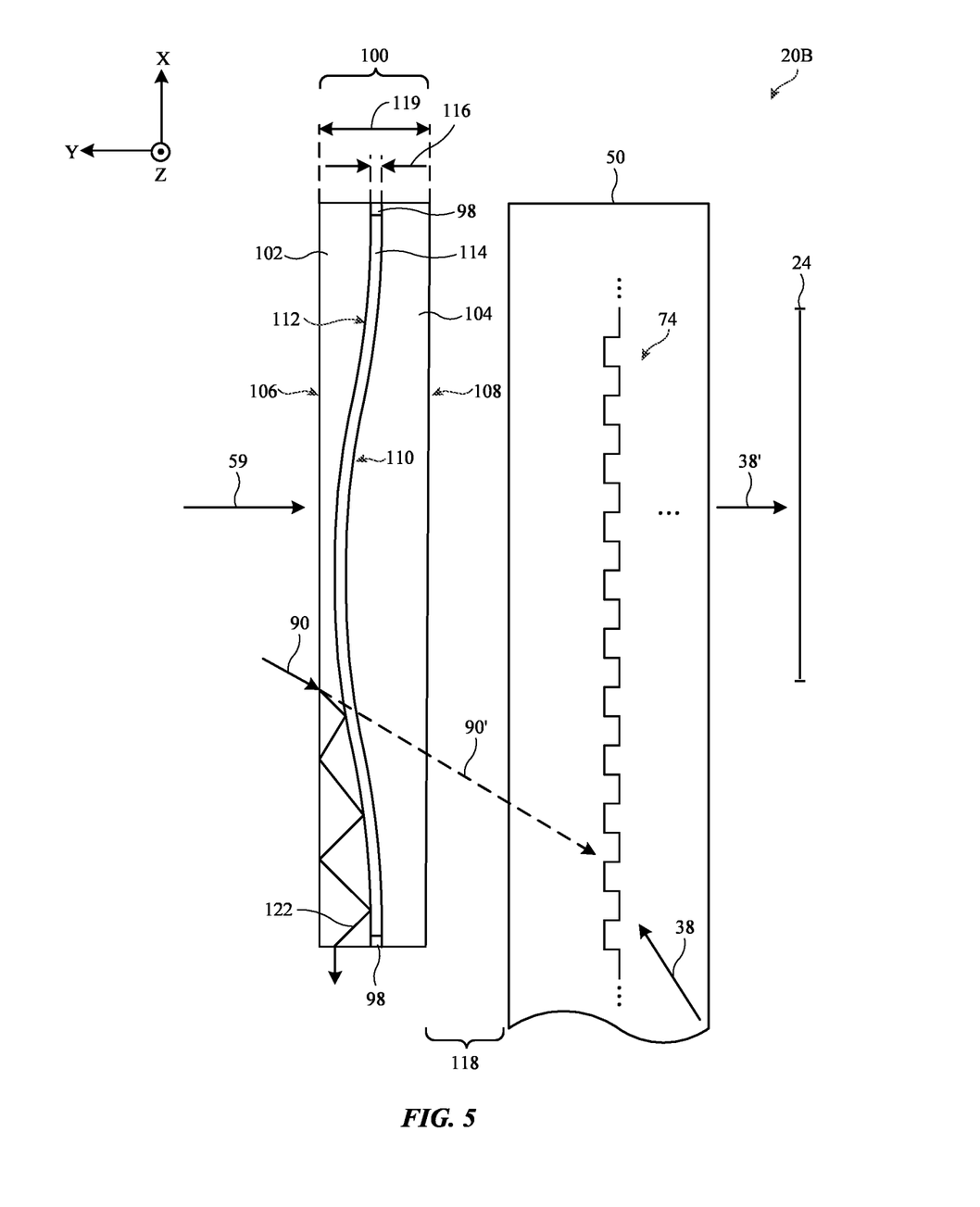
FIG. 5 is a top view of an illustrative waveguide provided with a surface relief grating structure and an artifact blocking structure for mitigating the production of visual artifacts in accordance with some embodiments.

To minimize the presence of distracting visual artifacts 92 at eye box 24, optical system 20B may include artifact mitigation structures that prevent SRG structures 74 in waveguide 50 from producing visual artifacts 92 at eye box 24. FIG. 5 is a top view showing one example of artifact mitigation structures may be provided in optical system 20B for mitigating visual artifacts 92.

As shown in FIG. 5, waveguide 50 may include one or more SRG structures 74. Each SRG structure 74 may include one or more SRGs formed in one or more layers of SRG media. The SRG(s) in each SRG structure 74 may be embedded within waveguide 50 or layered onto an exterior (e.g., planar) surface of waveguide 50. There may be multiple layers of SRGs and/or SRG structures that are stacked (e.g., along the Y-axis) on and/or within waveguide 50. SRG structure 74 of FIG. 5 may form output coupler 56, cross-coupler 54, and/or an interleaved coupler for waveguide 50 that performs both light expansion and output coupling for image light 38.

Optical system 20B may include (visual) artifact mitigation structures such as optical blocker 100. Optical blocker 100 may sometimes also be referred to as an artifact blocker, rainbow artifact blocker, or rainbow blocker. Optical blocker 100 may be separated from waveguide 50 by air gap 118. Optical blocker 100 may partially or completely overlap SRG structure 74 (e.g., when viewed in the −Y direction of FIG. 5). Optical blocker 100 may, for example, at least partially overlap a cross-coupler, output coupler, and/or interleaved coupler formed from SRG structure 74 in waveguide 50. If desired, optical blocker 100 may overlap only the portion(s) of SRG structure 74 that produce visual artifacts 92.

Optical blocker 100 may include a first optical wedge (prism) 102 and a second optical wedge (prism) 104 overlapping first optical wedge 102. Optical wedge 102 may have a first (exterior) surface 106 and an opposing second (interior) surface 112 that faces optical wedge 104. Optical wedge 104 may have a first (exterior) surface 108 that faces eye box 24 and an opposing second (interior) surface 110 that faces optical wedge 102. Optical wedges 102 and 104 may be formed from transparent material such as plastic or glass, as examples. Optical wedges 102 and 104 may have an index of refraction between 1.5 and 1.6, between 1.4 and 1.7, greater than 1.5, greater than 1.4, less than 2.0, or other indices. Optical blocker 100 may include a spacer 98 that attaches (affixes) optical wedge 102 to optical wedge 104 while maintaining a gap 114 between surface 112 of optical wedge 102 and surface 110 of optical wedge 104. Gap 114 may be filled with air or other transparent materials if desired. Gap 114 may have a width 116 (e.g., 0.05 mm-1.15 mm, 0.1 mm, greater than 0.05 mm, greater than 0.1 mm, etc.). Gap 114 may preserve the total internal reflection modes of optical wedge 102, for example. Optical blocker 100 may have a thickness 119 (e.g., 2-3 mm, 1-4 mm, 2.5-3.0 mm, etc.). In examples where an optically transparent non-air material fills gap 114, the material may have a relatively low refractive index compared to that of optical wedge 102 (e.g., a refractive index that differs from the refractive index of optical wedge 102 by 0.1 or more, 0.2 or more, 0.3 or more, 0.4 or more, 0.5 or more, 0.6 or more, etc.) to preserve total internal reflection within optical wedge 102). Filling gap 114 with optically transparent non-air materials may, for example, help to provide mechanical support and rigidity to optical blocker 100.

World light 90 may pass into optical wedge 102 (e.g., at relatively high incident angles with respect to the optical axis of eye box 24). The world light 90 that has entered optical wedge 102 may reflect off surface 112 of optical wedge 102 and back towards surface 106 at reflection angles within the total internal reflection (TIR) range of optical wedge 102 (e.g., due to the difference between the refractive index of optical wedge 102 and the refractive index of gap 114). The TIR range includes angles that, when light is reflected within the optical wedge angles of the TIR range, the light propagates via total internal reflection through the optical wedge (e.g., until exiting the lateral edge of the wedge or being absorbed). If desired, an absorptive material may be provided on the lateral edge of the wedge or elsewhere to absorb this light. Curving surface 112 changes the angle by which world light arrives at surface 112 as a function of the incident angle of the world light upon optical blocker 100, thereby allowing surface 112 to reflect some incident angles of world light within the TIR range of the waveguide (e.g., as given by Snell's law) while transmitting other angles of world light to eye box 24 via optical wedge 104 and waveguide 50.

In this way, world light 90 may be reflected by surface 112 such that the world light propagates laterally outwards within optical wedge 102 via total internal reflection, until the world light passes out of optical blocker 100 at an angle that points away from SRG structure 50, as shown by arrow 122. The three-dimensional shape (profile) of surface 112 may be selected to configure optical wedge 102 to capture world light 90 that is incident over a selected range of incident angles in this way for propagation, via total internal reflection, away from SRG structure 74 (as shown by arrow 122). The selected range of incident angles may be angles at which the incident world light 90 would otherwise have produced visual artifacts 92 had the incident world light 90 reached SRG structure 74. These incident angles may be relatively high incident angles measured with respect to the optical axis of the system. As examples, the selected range of incident angles may be angles greater than 80 degrees, 75 degrees, 70 degrees, 65 degrees, 60 degrees, 55 degrees, 45 degrees, etc. measured with respect to the Y-axis of FIG. 5. In general, the selected range of incident angles may be any angles that would otherwise produce rainbow artifacts (e.g., visual artifacts 92) at eye box 24 after interacting with SRG structure 74. Surface 112 of optical wedge 102 may be spherically curved, elliptically curved, or freeform curved in two or three dimensions, as examples.

In this way, optical blocker 100 may remove high incident angle world light 90 (which would otherwise produce visual artifacts 92 after interacting with SRG structure 74) from ever reaching SRG structure 74 in the first place. This may serve to effectively prevent the formation of visual artifacts 92 at eye box 24 (e.g., reducing visual artifact luminance ratio by as much as 65% or more). In the absence of optical blocker 100, for example, world light 90 would pass to SRG structure 74, as shown by arrow 90', causing SRG structure 74 to produce visual artifacts 92 at eye box 24.

If desired, surface 110 of optical wedge 104 may extend parallel to surface 112 of optical wedge 102 at all points along the surface. In other words, gap 114 may have a uniform width 116 across optical blocker 100. Optical wedges 102 and 104 may be transparent to world light 59 (e.g., world light incident upon optical system 20B at lower incident angles than the artifact-producing high incident angles of world light 90). World light 59 therefore passes (transmits) through optical blocker 100 and waveguide 50 for receipt at eye box 24 (e.g., within light 38'). At the same time, optical blocker 100 may effectively block, mitigate, or prevent high incident angle world light 90 from reaching SRG structure 74. The curvature of surface 112 of optical wedge 102 may impart a non-zero amount of optical power to world light 59. The geometry of optical wedge 104 may serve to reverse the optical power imparted onto world light 59 by optical wedge 102 by the time world light 59 reaches eye box 24. This may allow eye box 24 to receive world light 59 without undesirable distortion or magnification.

Figure 6:
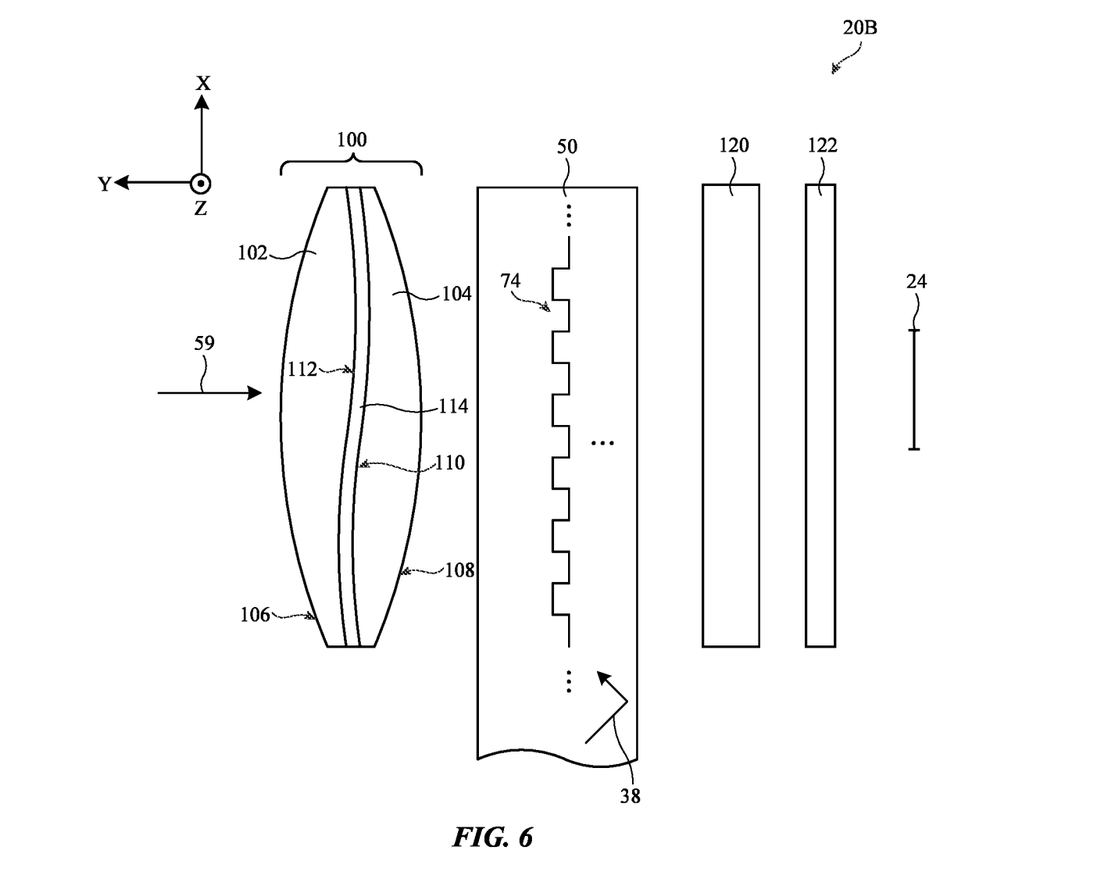
FIG. 6 is a top view of an illustrative waveguide provided with a surface relief grating structure and an artifact blocking structure that imparts optical power to world light in accordance with some embodiments.

The example of FIG. 5 is merely illustrative. If desired, surfaces 106 and/or 108 of optical blocker 100 may be curved, may be planar, or may have planar and curved portions. If desired, optical blocker 100 may be configured to impart non-zero optical power on the world light 59 that passes to waveguide 50 and thus eye box 24. FIG. 6 is a diagram showing one example of how optical blocker 100 may impart non-zero optical power on the world light 59 that passes to eye box 24.

As shown in FIG. 6, a lens such as lens 120 may be optically interposed between waveguide 50 (e.g., output coupler 56 of FIG. 2) and eye box 24. Waveguide 50 may be optically interposed between optical blocker 100 and lens 120. The strength (sometimes referred to as the power or diopter) of lens 120 can be selected to place virtual images in image light 38 at a desired distance from device 10. For example, it may be desirable to place computer-generated content such as text, icons, moving images, or other content at a certain virtual image distance. The placement of the virtual object at that distance can be accomplished by appropriate selection of the strength of lens 120. Lens 120 may be a negative lens for users whose eyes do not have refraction errors. The strength (larger net negative power) of lens 120 can therefore be selected to adjust the distance of the virtual object.

If desired, optical blocker 100 may have a complementary non-zero power value (e.g., a positive power with a magnitude that matches the magnitude of the negative power of lens 120). The curvature of surfaces 106, 112, 114, and/or 108 and/or the indices of refraction of optical wedges 102 and 104 may be selected to configure optical blocker 100 to exhibit the desired optical power (e.g., complementary power value). For example, if lens 120 has a power of –2.0 diopter, optical blocker 100 may have an equal and opposite power of +2.0 diopter for world light 59. In this type of arrangement, the positive power of optical blocker 100 cancels the negative power of lens 120. As a result, the overall power of lens 120 and optical blocker 100 taken together will be 0 diopter for world light 59. This allows a viewer to view real-world objects such as object 28 (FIG. 1) without optical influence from lens 120 or optical blocker 100. For example, a real-world object located far away from device 10 (effectively at infinity), may be viewed as if lens 120 and optical blocker 100 were not present. Lens 120 may therefore sometimes be referred to herein as biasing lens 120 (e.g., a negative bias or bias-lens) whereas optical blocker 100 is sometimes referred to herein as compensation lens 100 (e.g., a positive bias or bias+lens). In general, optical blocker 100 may impart non-zero optical power to world light 59 (e.g., via the curvature of surfaces 106, 112, 110, and/or 108) to form a bias+lens, a compensation lens, etc. for world light 59.

For a user with satisfactory uncorrected vision, this type of complementary lens arrangement therefore allows virtual objects to be placed in close proximity to the user (e.g., at a virtual image distance of 0.5-5 m, at least 0.1 m, at least 1 m, at least 2 m, less than 20 m, less than 10 m, less than 5 m, or other suitable near-to-midrange distance from device 10 while simultaneously allowing the user to view real world objects without modification by the optical components of the optical system). For example, a real-world object located at a distance of 2 m from device 10 (e.g., a real-world object being labeled by a virtual text label at a virtual image distance of 2 m) will optically appear to be located 2 m from device 10. This is merely illustrative and, if desired, lens 120 and optical blocker 100 need not be complementary lenses (e.g., lens 120 and optical blocker 100 may have any desired optical power(s)).

Some users of device 10 may require vision correction. Vision correction may be provided using tunable lenses and/or fixed (e.g., removable) lenses (sometimes referred to as supplemental lenses, vision correction lenses, removable lenses, or clip-on lenses). For example, vision correction may be provided for a user who has astigmatism by adding a removable astigmatism correction lens to the display system of FIG. 1. Other vision correction lenses may also be used, if desired. In general, the vision correction lenses may include lenses to correct for ametropia (eyes with refractive errors) such as lenses to correct for nearsightedness (myopia), lenses to correct for farsightedness (hyperopia), and lenses to correct for astigmatism, prism lenses to correct for skewed vision, lenses to help accommodate age-related reductions in the range of accommodation exhibited by the eyes (sometimes referred to as presbyopia), and/or other vision disorders.

As shown in FIG. 6, for example, lens 120 or an additional lens optically interposed between lens 120 and eye box 24 such as lens 122 may be configured to match a user's normal eyeglass prescription. Lens 122 may therefore sometimes be referred to herein as vision correction lens 122 or prescription lens 122. For example, lens 122 may be a positive lens to correct for a user's farsightedness, a negative lens to correct for a user's nearsightedness, may be an asymmetric lens to correct for a user's astigmatism, may be a progressive lens for a user with presbyopia, etc.

Lenses 120 and 122 may be provided with any desired optical powers and any desired shapes (e.g., plano-convex lenses, plano-concave lenses, convex-concave lenses, etc.). Lens 122 or 120 may be omitted if desired. In scenarios where lens 122 is omitted, lens 120 may have a shape that provides desired prescription vision correction. If desired, lens 120, lens 122, optical wedge 102, and/or optical wedge 104 may be formed from a gradient index material.

If desired, lens 122 may be omitted and lens 120 may be configured to form a prescription lens. In one example, optical blocker 100 may have a positive optical power (e.g., +2.0 diopter) whereas lens 120 is a plano-concave prescription lens having a non-complementary negative optical power (e.g., −8.0 diopter). In another example, optical blocker 100 may have a positive optical power (e.g., +2.0 diopter) whereas lens 120 is a convex-concave prescription lens having a non-complementary negative optical power (e.g., −8.0 diopter). In yet another example, optical blocker 100 may have a positive optical power (e.g., +2.0 diopter) whereas lens 120 is a convex-concave prescription lens having a non-complementary negative optical power (e.g., −8.0 diopter). Any desired combination of these arrangements may be used if desired. If desired, lenses 120 and/or 122 and/or optical blocker 100 may be removable from optical system 20B (e.g., lenses 120 and/or 122 and/or optical blocker 100 may be integrated into a housing that may be clipped, affixed, attached, screwed, or otherwise secured to, on, or over waveguide 50). This may, for example, allow different users having different vision correction needs to use the same device 10 to view images at eye box 24 without unsightly visual artifacts 92.

The foregoing is merely illustrative and various modifications can be made to the described embodiments. The foregoing embodiments may be implemented individually or in any combination.

What is claimed is:

1. An electronic device comprising:
   a waveguide configured to propagate light via total internal reflection;
   a surface relief grating on the waveguide and configured to diffract the light; and
   an optical blocker at least partially overlapping the surface relief grating wherein:
      the optical blocker is configured to transmit, to an eye box through the waveguide, a first portion of world light that is incident upon the optical blocker within a first range of incident angles,
      the optical blocker is configured to block, from reaching the surface relief grating, a second portion of the world light that is incident upon the optical blocker within a second range of incident angles different from the first range of incident angles,
      the optical blocker includes a first optical wedge having a first surface and having a first curved surface opposite the first surface,
      the optical blocker includes a second optical wedge having a second surface and having a second curved surface opposite the second surface,
      the first curved surface and the second surface face the waveguide,
      the first optical wedge is configured to transmit the first portion of the world light to the waveguide through the second optical wedge, and
      the first optical wedge is configured to propagate the second portion of the world light away from the second optical wedge via total internal reflection between the first surface and the first curved surface.

2. The electronic device of claim 1, wherein the optical blocker comprises an air gap between the first curved surface and the second curved surface.

3. The display system electronic device of claim 2, wherein the second range of incident angles are at higher angles with respect to an optical axis of the optical blocker than the first range of incident angles.

4. The electronic device of claim 1, wherein the first curved surface extends parallel to the second curved surface.

5. The electronic device of claim 4, wherein the first curved surface comprises a freeform curved surface.

6. The electronic device of claim 4, wherein the second surface is separated from the waveguide by an air gap.

7. The electronic device of claim 1, further comprising:
   an output coupler on the waveguide and configured to couple the light out of the waveguide and towards an eye box, wherein the output coupler includes the surface relief grating.

8. The electronic device of claim 1, wherein the first surface is configured to transmit the first and second portions of the world light into the first optical wedge, the first surface being curved to is impart a non-zero optical power to the first and second portions of the world light upon transmission of the first and second portions of the world light into the first optical wedge.

9. The electronic device of claim 8, further comprising:
   a lens optically interposed between the waveguide and the eye box, wherein the lens is configured to transmit the first portion of the world light and wherein the lens is configured to at least partially reverse the non-zero optical power imparted to the first portion of the world light by the first surface.

10. The electronic device of claim 8, wherein the second surface is curved.

11. The electronic device of claim 1, wherein the first surface is curved.

12. The electronic device of claim 11, wherein the second surface is curved.

13. The electronic device of claim 1, wherein the second surface is curved.

14. An optical system configured to display light, the optical system comprising:
    a waveguide;
    a first optical wedge having a first surface facing the waveguide and a second surface opposite the first surface, wherein the first surface is curved and the waveguide is optically interposed between the first optical wedge and a location at which the light is to be displayed;
    a second optical wedge having a third surface facing the waveguide and a fourth surface opposite the third surface, wherein the fourth surface is curved and faces the second surface; and
    a surface relief grating structure on the waveguide, wherein
       the first and second optical wedges at least partially overlap the surface relief grating structure,
       the first optical wedge is configured to transmit, to the location through the second optical wedge and the waveguide, a first portion of world light that is incident upon the second surface within a first range of incident angles, and
       the first optical wedge is configured to propagate, away from the second optical wedge via total internal reflection between the first and second surfaces, a second portion of the world light that is incident upon the second surface within a second range of incident angles different from the first range of incident angles.

15. The optical system of claim 14, wherein the fourth surface is separated from the first surface by an air gap.

16. The optical system of claim 15, wherein the first surface extends parallel to the fourth surface.

17. The optical system of claim 15, wherein the second surface is curved and non-parallel with respect to the first, third, and fourth surfaces and wherein the third surface is curved and non-parallel with respect to the first, second, and fourth surfaces.

18. An electronic device comprising:
a waveguide;
a surface relief grating on the waveguide and configured to propagate light via total internal reflection;
a first optical wedge having a first surface and having a first curved surface opposite the first surface, wherein the first curved surface faces the waveguide; and
a second optical wedge having a second surface and having a second curved surface opposite the second surface, wherein the second curved surface faces the first curved surface and extends parallel to the first curved surface, wherein:
the waveguide is optically interposed between the second optical wedge and a location at which the light is to be displayed;
the first and second optical wedges at least partially overlap the surface relief grating,
the second curved surface is separated from the first curved surface by a first gap,
the second optical wedge is separated from the waveguide by a second gap,
the first optical wedge is configured to transmit, to the location through the second optical wedge and the waveguide, a first portion of world light that is incident upon the first optical wedge within a range of incident angles, and
the first optical wedge is configured to propagate, away from the second optical wedge via total internal reflection between the first surface and the first curved surface, a second portion of the world light that is incident upon the first optical wedge from outside of the range of incident angles.

19. The electronic device of claim 18, wherein the first gap comprises air.

20. The electronic device of claim 18, wherein the first gap comprises a non-air material having a refractive index different from that of the first optical wedge.

21. The electronic device of claim 18, wherein:
the first surface is convex,
the second surface is convex,
the first portion of the world light passes from the first optical wedge to the second optical wedge through the first gap,
the first gap is a first air gap,
the first portion of the world light passes from the first gap to the second gap through the second optical wedge, the second gap is a second air gap,
the first portion of the world light passes from the second gap to the waveguide,
the first portion of the world light passes from the waveguide to the location,
the location is within an eye box,
the second portion of the world light does not enter the second optical wedge, and
the electronic device includes a spacer that attaches the first curved surface to the second curved surface at a periphery of the first air gap.

\* \* \* \* \*

UNITED STATES PATENT AND TRADEMARK OFFICE
CERTIFICATE OF CORRECTION

PATENT NO. : 12,379,537 B1
APPLICATION NO. : 17/898142
DATED : August 5, 2025
INVENTOR(S) : Di Hu et al.

Page 1 of 1

It is certified that error appears in the above-identified patent and that said Letters Patent is hereby corrected as shown below:

In the Claims

Column 12, Line 13, "curved to is impart" should read -- curved to impart --

Signed and Sealed this
Ninth Day of September, 2025

Coke Morgan Stewart
*Acting Director of the United States Patent and Trademark Office*